United States Patent [19]
Justak

[11] Patent Number: 6,118,134
[45] Date of Patent: Sep. 12, 2000

[54] OPTICAL MASS GAUGE SENSOR HAVING AN ENERGY PER UNIT AREA OF ILLUMINATION DETECTION

[76] Inventor: John F. Justak, 1106 Paul St., Stuart, Fla. 34996

[21] Appl. No.: 09/143,742

[22] Filed: Aug. 31, 1998

Related U.S. Application Data

[60] Provisional application No. 60/056,054, Sep. 2, 1997.
[51] Int. Cl.[7] ................................................. G01N 21/85
[52] U.S. Cl. ........................... 250/577; 250/574; 73/293; 340/619
[58] Field of Search ..................................... 250/577, 574, 250/576, 904, 903; 73/293, 290 R; 340/619; 356/436

[56] References Cited

U.S. PATENT DOCUMENTS 5,065,037  11/1991  Finney et al. ........................... 250/577

*Primary Examiner*—Que T. Le
*Attorney, Agent, or Firm*—Holland & Knight LLP

[57] ABSTRACT

An optical mass gauge sensor is disclosed comprising a vessel having an interior surface which reflects radiant energy at a wavelength at least partially absorbed by a fluid contained within the vessel, an illuminating device for introducing radiant energy at such wavelength into the vessel interior, and, a detector for measuring the energy per unit area of illumination within the vessel created by the radiant energy which is not absorbed by the fluid.

22 Claims, 3 Drawing Sheets

OPTICAL MASS GAUGE SENSOR HAVING AN ENERGY PER UNIT AREA OF ILLUMINATION DETECTION

This application claims benefit of Provisional application 60/056,054 filed Sep. 2, 1997.

GOVERNMENT LICENSE RIGHTS

The U.S. Government has a paid-up license in this invention and the right in limited circumstances to require the patent owner to license others on reasonable terms as provided for by the terms of Contract No. NAS8-98068 awarded by the National Aeronautics and Space Administration (NASA).

FIELD OF THE INVENTION

This invention relates to fluid sensors, and, more particularly, to a method and apparatus for determining the quantity of a fluid within a closed vessel using optical sensing techniques.

BACKGROUND OF THE INVENTION

Cryogenic fluids such as liquid hydrogen, liquid oxygen, liquid natural gas and others are used in applications such as the propulsion of vehicles, including space craft operating in zero gravity conditions. Accurate measurement of the quantity of cryogenic fluid within a storage vessel is made difficult by the fact that such fluids are not stationary within the vessel, and can contact one or more areas of the inner surface of the vessel or remain completely out of contact with the vessel wall.

One cryogenic fluid sensor is disclosed, for example, in U.S. Pat. No. 5,393,736 which describes a sensor employing a high temperature ceramic superconducting material capable of measuring the change in electrical resistance as it is submerged in a liquified cryogen. Other cryogenic liquid level sensors operate using pressure sensors, thermocouple sensors, or other point sensors such as wound resistor elements in linear carbon resistors. All of these types of sensors indicate a change in temperature or pressure when the liquid level changes, and covers or uncovers the sensor.

One problem with sensors of the type described above is that they cannot operate in zero gravity conditions because the fluid level is sensed in accordance with its relative position to a fixed position sensor. As noted above, cryogenic fluid can "float" or freely move about the interior of a vessel, particularly in zero gravity conditions. Consequently, the fluid level cannot be accurately determined with respect to a fixed point of reference. Additionally, such prior sensors do not have the capability of sensing the quantities of different fluids which may be present in the same vessel, i.e., a liquid and a gas, two different liquids or two different gases.

SUMMARY OF THE INVENTION

It is therefore among the objectives of this invention to provide a method and apparatus for measuring the quantity of fluid within a storage vessel which is capable of operating under zero gravity conditions, which is effective to sense the quantity of cryogenic and other types of liquid and gaseous fluids, which is capable of sensing the quantities of different types of fluids within the same vessel, which can be retrofitted to existing vessels, and, which is highly accurate.

These objectives are accomplished in a method and apparatus according to this invention which comprises a vessel having an interior surface which reflects radiant energy at a wavelength absorbed by the fluid contained within the vessel, an illuminating device for introducing radiant energy at such wavelength into the vessel interior, and, a detector for sensing the radiant energy within the vessel interior which is not absorbed by the fluid and measuring the energy per unit area of illumination.

This invention is predicated on the concept that the amount of radiant energy of a particular wavelength which is absorbed by a fluid present within the interior of a vessel is proportional to the quantity of fluid in the vessel. In the presently preferred embodiment, a closed vessel in the shape of a sphere, cylinder or the like is provided with an illuminating device operative to direct radiant energy into the vessel interior, and a photo-detector capable of measuring the energy per unit area of illumination (watts/cm$^2$) created by the radiant energy which is not absorbed by the fluid within the vessel. The photo-detector produces a signal having a component representative of the energy per unit area of illumination, which is compared with predetermined or known fluid quantities within that vessel to obtain the actual or sensed fluid level.

Operation of the fluid quantity sensing method and apparatus of this invention is dependent upon an application of integrating sphere technology. An integrating sphere is a hollow structure which is coated with an optically-diffusing, highly reflective paint, or is otherwise provided with a highly radiant energy reflective interior surface. An incident beam of light which irradiates any portion of the interior surface of such sphere is integrated over the entire interior surface by virtue of multiple internal reflections. As a result, the interior surface of the sphere is completely illuminated with substantially uniform light energy, and a sensor positioned at any location within the sphere interior can accurately measure the energy per unit area of illumination.

In the method of operation of this invention, the illuminating device is chosen to emit radiant energy at whatever wavelength has the highest absorption by the fluid within the vessel. In turn, the vessel is preferably coated or otherwise provided with the capability of substantially reflecting radiant energy at such wavelength. Upon activation of the illuminating device, the interior surface of the vessel becomes illuminated with substantially uniform light energy in accordance with the integrating sphere theory described above. The fluid within the vessel, particularly in zero gravity conditions, may be in contact with the vessel wall, free floating, or some combination thereof. In any event, the fluid absorbs some of the radiant energy in the course of passage therethrough, and the amount of energy absorbed is proportional to the amount of fluid in the vessel. As the amount of fluid present within the vessel decreases, the less amount of energy is absorbed and the more energy is sensed or measured by the photo-detector, and vice versa.

This "absorption" of radiant energy by the fluid is related to the absorption coefficient, or the measure of the rate of decrease of intensity of a beam of photons or particles in the course of passage through a particular substance or medium. When radiant energy enters a substance or medium, part of it is subjected to absorption and another part is scattered. The absorbed portion ceases to exist as radiation and is converted to other forms of energy such as heat, or is re-emitted as secondary radiation otherwise known as fluorescence.

Conventional methods of measuring the absorption coefficient for a particular fluid or other substance involve using a spectrophotometer. A spectrophotometer operates by directing a beam of monochromatic light through a sample contained in a curette, and then the intensity-reduced beam irradiates a photodetector positioned about 180° from incident. The errors which can arise in this type of measurement of the absorption coefficient include reflection, convergence, spectral slit width, scattering, fluorescence, chemical reaction, and, inhomogeneity and anisotropy of the sample.

These types of errors in measurement of the absorption coefficient are substantially eliminated by the method and apparatus of this invention. As noted above, by employing a vessel which functions as an integrating sphere, the entire interior of the vessel is uniformly illuminated with radiant energy from a single beam of light. That portion of the radiant energy introduced into the vessel interior which is not absorbed by the fluid can be measured at essentially any location within the interior of the vessel. The position of the photo-detector is therefore completely independent of any fluid level or position of the fluid within the vessel, allowing an accurate energy measurement to be taken in zero gravity or any other conditions. Preferably, the illuminating device and photo-detector are positioned relative to one another so as to avoid direct radiation of the detector by the illuminating device, or, alternatively, a barrier can be mounted within the vessel interior in position to physically block direct irradiation of the photodetector.

DETAILED DESCRIPTION OF THE INVENTION

Figure 1:
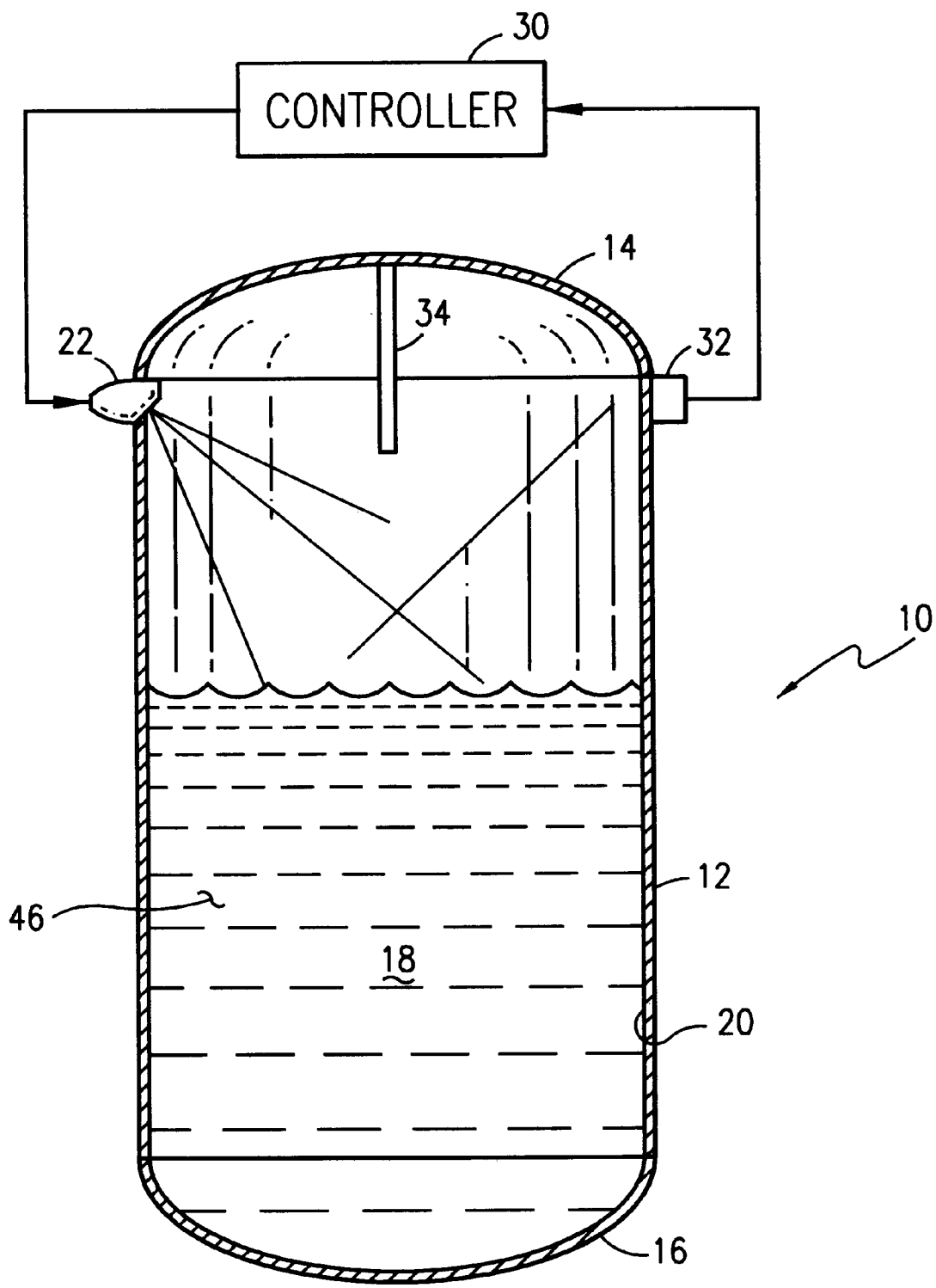
FIG. 1 is an elevational view, in cross section, of one embodiment of the apparatus of this invention.

Referring initially to FIG. 1, a vessel 10 is illustrated which includes a generally cylindrical-shaped wall 12 closed at opposite ends by hemispherical end caps 14 and 16 defining a hollow interior 18. The interior surface 20 of wall 12 is preferably coated with an optically-diffusing, highly reflective paint, or is otherwise capable of reflecting radiant energy of a particular wavelength, as described below.

An illuminating device 22 is mounted to the wall 12 of the vessel in position to introduce radiant energy into the vessel interior 18. The device 22 includes a light source 24 operated by a controller 30, schematically depicted in FIG. 1. The controller 30 is operative to turn on and off the light source 24 to obtain a fluid quantity measurement in the manner described below.

In one presently preferred embodiment, a radiant energy detecting device, such as a photo-detector 32, is mounted to the wall 12 of vessel 10 opposite the light source 24. The photo-detector 32 is operative to measure the energy per unit area of illumination (watts/cm$^2$) within the vessel interior 18, and send a signal to the controller 30 having a component which is representative of such measurement. Preferably, a barrier 34 is mounted within the interior 18 of the vessel 10 in position to prevent direct irradiation of the photo-detector 32 by the illuminating device 22.

Figure 3:
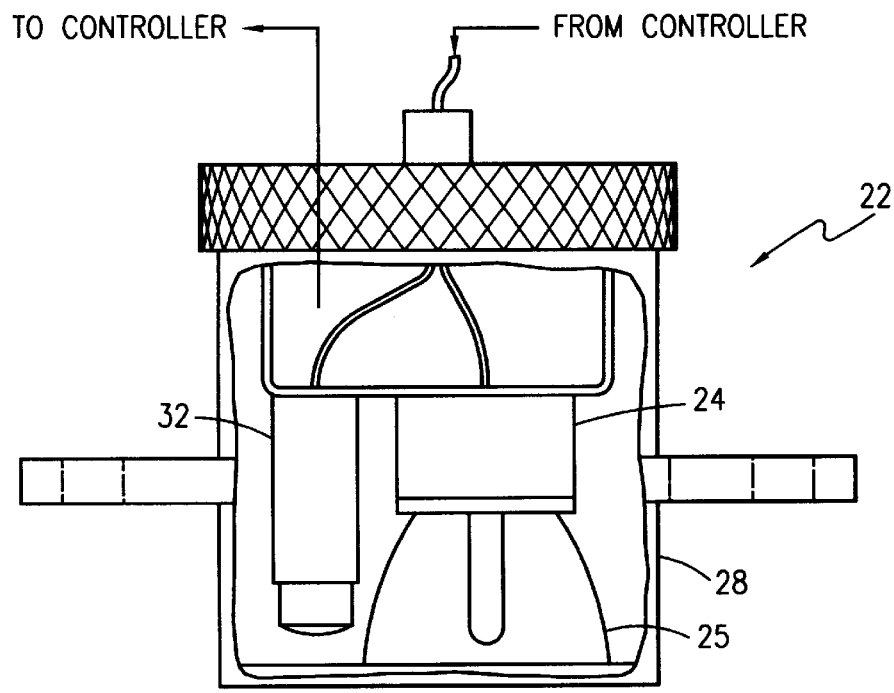
FIG. 3 is an enlarged view of one embodiment of a combined illuminating device and detector.
Figure 4:
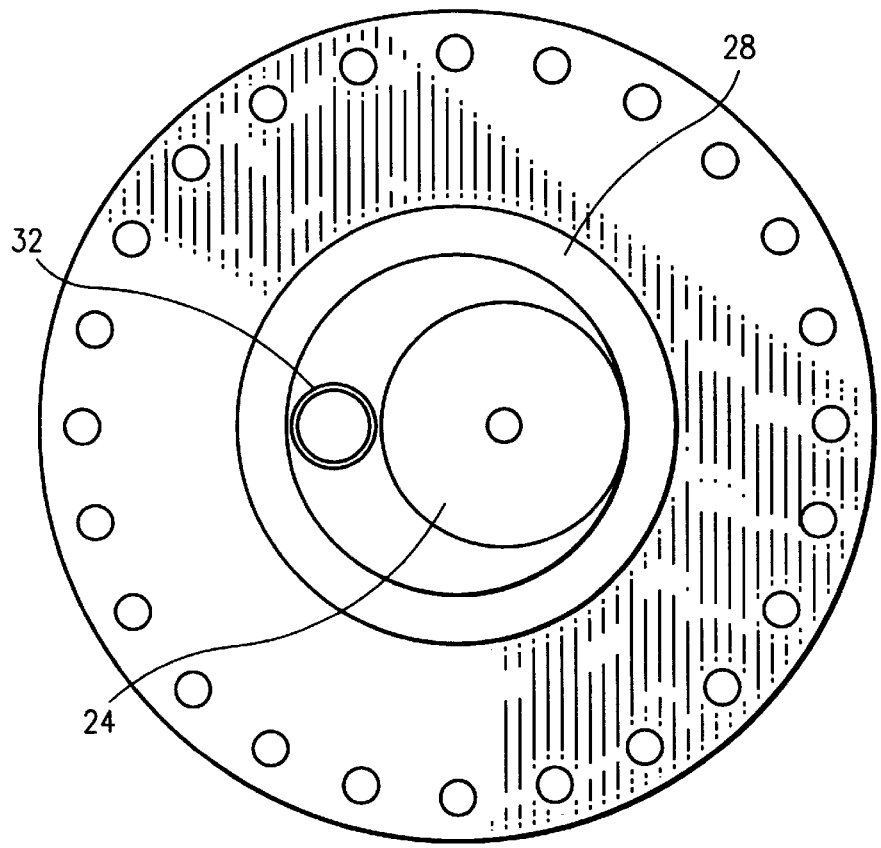
FIG. 4 depicts the devices of FIG. 3 as viewed from the outside of the vessel.

Referring to FIGS. 3 and 4, it is contemplated that the light source 24 and photo-detector 32 can be mounted side-by-side within a housing 28 carried by the wall 12 of the vessel 10, instead of on opposite sides thereof as depicted in FIG. 1. The light source 24 is provided with a parabolic lens 25 to direct radiant energy into the vessel interior 18 without directly irradiating the photo-detector 32.

Figure 2:
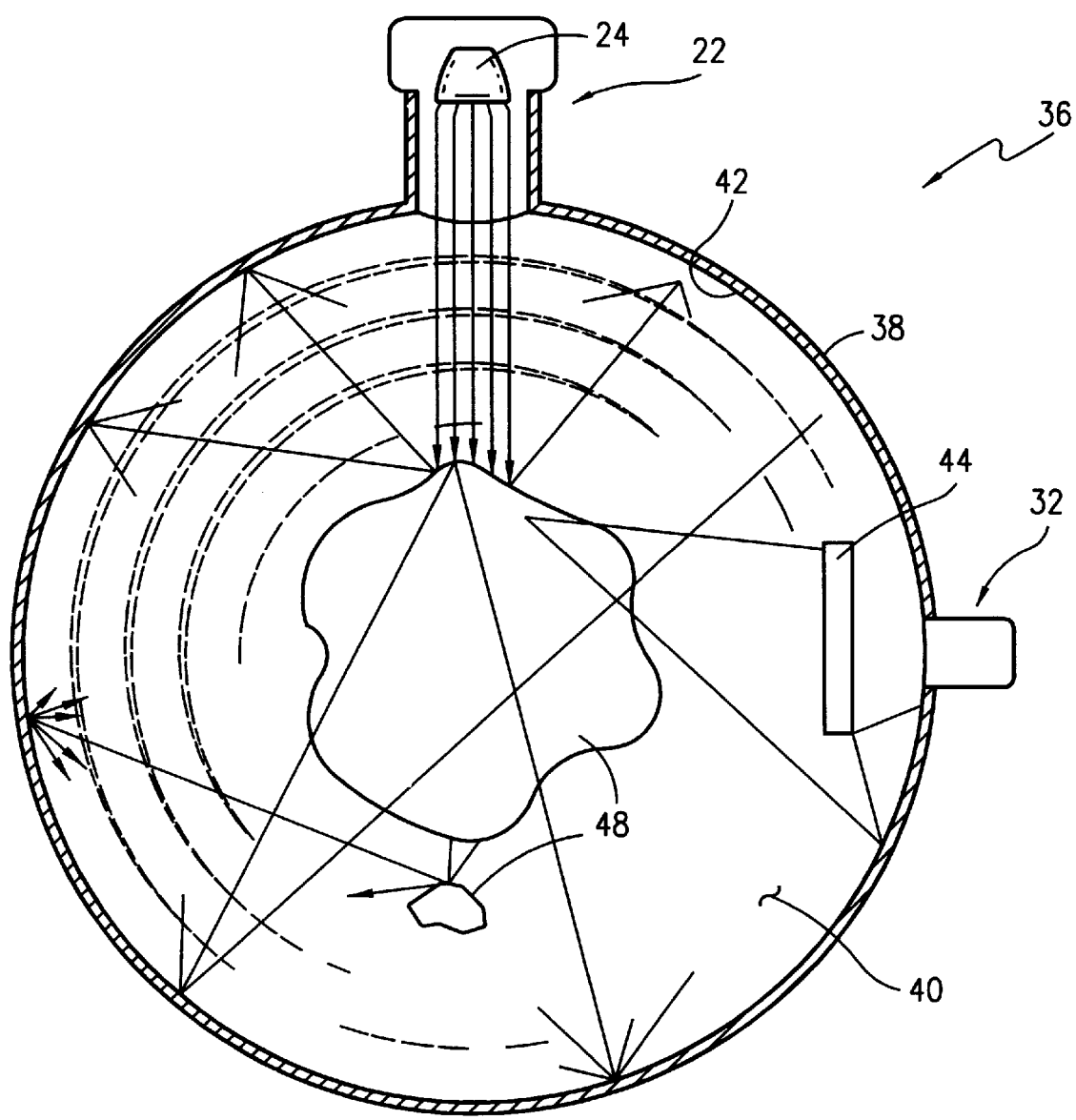
FIG. 2 is a cross sectional view of an alternative embodiment herein.

An alternative embodiment of the apparatus of this invention is shown in FIG. 2, which depicts a vessel 36 having a spherical-shaped wall 38 defining a hollow interior 40. The interior surface 42 of wall 38 is coated with an optically-diffusing, highly reflective paint, or is otherwise capable of deflecting radiant energy of a particular wavelength. The wall 38 mounts an illuminating device 22 and a photo-detector 32 of the same type described above in connection with a discussion of FIG. 1. Preferably, a barrier 44 is mounted within the vessel 36 in position to block direct irradiation of the photo-detector 32 by the illuminating device 22.

In the illustrated embodiments of this invention, a fluid 46 is contained within the vessel 10, and the vessel 36 receives a fluid 48. For purposes of illustration, the fluid 46 is depicted in the liquid phase within vessel 10 under the influence of gravity, whereas the fluid 48 in vessel 36 is in the solid or gaseous phase in zero gravity. Regardless of the phase of the fluid, or the gravitational conditions, the method and apparatus of this invention is effective to provide a quantitative measurement of the fluid remaining within the vessel 10 or vessel 36.

In the embodiment of FIG. 1, for example, the illuminating device 22 is operated by controller 30 to direct radiant energy from light source 24 at the wavelength which has the highest absorption by the fluid 46. The interior surface 20 of the vessel wall 12 is coated or otherwise capable of substantially reflecting radiant energy of such wavelength. As a result of integrating sphere theory, described above, the entire interior 18 of vessel 10 is uniformly illuminated with the radiant energy from light source 24. The barrier 34 is effective to block radiant energy from directly passing between the illuminating device 22 and the photo-detector 32. A portion of the radiant energy is absorbed by the fluid 46, which is proportional to the amount of fluid 46 within the vessel 10. The radiant energy which is not absorbed by the fluid 46 is measured by the photo-detector 32 as a function of the energy per unit area of illumination, e.g., watts per centimeter squared. The photo-detector 32 is effective to produce a signal having a component representative of this measurement, which is sent to the controller 30 as schematically depicted in FIG. 1.

The illumination device 22, photo-detector 32 and barrier 44 operate in the identical fashion in the spherical-shaped vessel 36 illustrated in FIG. 2. The fluid 48 is subjected to radiant energy from device 22, which is at least partially absorbed dependent on the quantity of fluid 48 within the vessel 36. The energy per unit area of illumination, created by that portion of the radiant energy which is not absorbed by the fluid 48, is measured by the photo-detector 32. It can be appreciated that such measurement can be obtained regardless of where the fluid 48 is positioned within the vessel 36, and the photo-detector 32 can be located essentially anywhere in the vessel interior 40 except in direct alignment with the light source 24 of illumination device 22.

It is also contemplated that the method and apparatus of this invention can be employed in applications wherein the vessel 10 or 36 contains multi-phase fluids and/or different fluids of the same phase. In these situations, the illuminating device 22 is operated to introduce radiant energy into the vessel 10 or 36 at different wavelengths, each of which is selected according to whatever wavelength is absorbed to the greatest extent by the respective fluids within the vessel interior. The photo-detector 32 separately measures the energy per unit area of illumination for each particular wavelength, so that the quantity of each fluid within the vessel 10 or 36 can be determined.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but the invention will include all embodiments falling within the scope of the appended claims.

What is claimed is:

1. Apparatus for sensing the quantity of a fluid which is capable of at least partially absorbing radiant energy having a particular wavelength, comprising:

a vessel having an interior whose surface reflects radiant energy at said particular wavelength, said interior of said vessel containing said fluid;

an illuminating device for introducing radiant energy at said particular wavelength into said interior of said vessel;

a detector for measuring the energy per unit area of illumination created by the radiant energy within said interior of said vessel which is not absorbed by said fluid.

2. The apparatus of claim 1 in which said illuminating device is a light source mounted to said vessel in a position to introduce radiant energy into said interior of said vessel.

3. The apparatus of claim 2 in which said illuminating device further includes a detector mounted to said vessel in proximity to said light source.

4. The apparatus of claim 1 in which said surface of said interior of said vessel is coated with an optically-diffusing, highly reflective paint.

5. The apparatus of claim 1 in which said detector is a photo-detector.

6. The apparatus of claim 1 in which said fluid is a cryogenic liquid.

7. The apparatus of claim I in which said fluid is liquid natural gas.

8. The apparatus of claim 1 further including a barrier mounted within said interior of said vessel in position to substantially prevent the direct irradiation of said detector with radiant energy emitted from said illuminating device.

9. Apparatus for sensing the quantity of fluid contained within the interior of a vessel whose interior surface substantially reflects radiant energy of a particular wavelength which is at least partially absorbed by the fluid, comprising:

an illuminating device for introducing radiant energy at said particular wavelength into the interior of the vessel;

a detector for measuring the energy per unit area of illumination created by the radiant energy within said interior of said vessel which is not absorbed by said fluid.

10. The apparatus of claim 9 in which said illuminating device is a light source mounted to said vessel in a position to introduce radiant energy into said interior of said vessel.

11. The apparatus of claim 10 in which said illuminating device further includes a detector mounted to said vessel in proximity to said light source without being directly irradiated by said light source.

12. The apparatus of claim 9 in which said detector is a photo-detector.

13. The apparatus of claim 9 in which said fluid is a cryogenic liquid.

14. The apparatus of claim 9 in which said fluid is liquid natural gas.

15. Apparatus for sensing the quantity of at least a first fluid and a second fluid contained within the interior of a vessel whose interior surface substantially reflects radiant energy having a first wavelength which is at least partially absorbed by the first fluid and a second wavelength which is at least partially absorbed by the second fluid, said apparatus comprising:

an illuminating device capable of introducing radiant energy containing the first wavelength and radiant energy containing the second wavelength into the interior of the vessel;

a detector for measuring the energy per unit area of illumination attributable to the radiant energy at each of the first wavelength and said second wavelengths which is not absorbed by the first and second fluids, respectively.

16. The apparatus of claim 15 in which the first fluid is a gas and the second fluid is a liquid.

17. The apparatus of claim 15 in which each of the first and second fluids is a liquid.

18. The apparatus of claim 15 in which each of the first and second fluids is a gas.

19. The method of detecting the quantity of at least one fluid within the interior of a vessel, comprising:

(a) introducing radiant energy into the interior of the vessel having a wavelength which is at least partially absorbed by the fluid therein, and which is at least partially reflected by the interior surface of the vessel;

(b) detecting the radiant energy within the interior of the vessel which is not absorbed by the fluid;

(c) producing a signal having a component which is representative of a measurement of the energy per unit area of illumination created by the radiant energy not absorbed by the fluid.

20. The method of claim 19 in which step (a) comprises directing radiant energy from a light source communicating with the interior of the vessel.

21. The method of claim 19 in which step (b) comprises sensing radiant energy within the interior of the vessel with a photo-detector communicating with the interior of the vessel.

22. The method of claim 19 in which step (a) comprises directing radiant energy into the interior of the vessel having a first wavelength which is at least partially absorbed by a first fluid within the vessel, and directing radiant energy into the interior of the vessel having a second wavelength which is at least partially absorbed by a second fluid within the vessel.

* * * * *